(12) United States Patent
Oh

(10) Patent No.: US 7,863,775 B2
(45) Date of Patent: Jan. 4, 2011

(54) POWER MANAGEMENT AND CONTROL IN ELECTRONIC EQUIPMENT

(75) Inventor: Jang Geun Oh, Suwon (KR)

(73) Assignee: LG Electronics Inc., Seoul (KR)

(*) Notice: Subject to any disclaimer, the term of this patent is extended or adjusted under 35 U.S.C. 154(b) by 834 days.

(21) Appl. No.: 11/689,600

(22) Filed: Mar. 22, 2007

(65) Prior Publication Data

US 2007/0224461 A1 Sep. 27, 2007

(30) Foreign Application Priority Data

Mar. 23, 2006 (KR) .................. 10-2006-0026658
Feb. 13, 2007 (KR) .................. 10-2007-0014948

(51) Int. Cl.
*H02J 7/00* (2006.01)
*H02J 9/00* (2006.01)
(52) U.S. Cl. ........................................ 307/66
(58) Field of Classification Search ............ 307/66, 307/80, 86
See application file for complete search history.

(56) References Cited

U.S. PATENT DOCUMENTS

2005/0206342 A1* 9/2005 Aleyraz et al. .............. 320/101
2009/0278406 A1* 11/2009 Hoffman ..................... 307/66

* cited by examiner

*Primary Examiner*—Jared J Fureman
*Assistant Examiner*—Carlos Amaya
(74) *Attorney, Agent, or Firm*—Fish & Richardson P.C.

(57) ABSTRACT

To manage power of a fuel cell and a battery for an electronic device, an amount of power consumed by an operation module in the electronic device may be sensed. Generated voltage capacity of the fuel cell and remaining capacity of the battery may be acquired. The battery may be charged/discharged based on the sensed amount of consumed power and the generated voltage capacity of the fuel cell. A performance limit signal may be provided to the operation module if the sensed amount of consumed power exceeds a sum of the generated voltage capacity of the fuel cell and the remaining capacity of the battery. The operation module may adjust a frequency of an internal operation clock in response to the performance limit signal.

19 Claims, 2 Drawing Sheets

POWER MANAGEMENT AND CONTROL IN ELECTRONIC EQUIPMENT

BACKGROUND

1. Field

The present invention relates to an apparatus and method for power management and control in portable electronic equipment, and more particularly, to an apparatus and method for power management and control of a battery pack or a fuel cell pack for generating a voltage when the fuel cell pack is connected to portable electronic equipment having an operation block driven by a driving voltage of the battery pack.

2. Description of Related Art

With the recent development of electrical and electronic communication and electrochemistry-related industries, portable electronic equipment such as laptop computers, and personal digital assistants (PDAs) is typically driven by a voltage of a battery. For this reason, there have been conducted researches on a longer life span of a battery. Of course, when the equipment is provided with an AC-adaptor that converts commercial power (AC power) into a DC voltage, the equipment does not require such a battery at places where the commercial power is available.

However, because a primary object of portable electronic equipment is to allow a user to use the equipment during movement, it is required to drive an operation block of portable electronic equipment by means of a voltage of a battery during a longer period of time at outdoor places where commercial power is not available. To this end, portable electronic equipment contains a power management and control apparatus for efficiently managing the power of a battery.

Further, various power supplies have been developed to extend a use time of portable electronic equipment such as notebook computers. As a typical example, there is a fuel cell that generates electricity through the supply of fuel and outputs a voltage. As known in the art, the fuel cell generates a voltage in an electricity-generating body by supplying fuel such as hydrogen or methanol and air as an oxidizer gas to a stack so that the fuel and the air can electrochemically react with each other. A fuel cell pack includes a DC-DC converter for adjusting the output of power (voltage) generated by a fuel cell, and a fuel cell controller for controlling the output of the DC-DC converter according to an external demand.

An example in which such a fuel cell and a rechargeable battery are integrated into a hybrid pack to be used as a driving power source for portable electronic equipment is disclosed in International Publication No. WO 2005/003941 published on Jan. 13, 2005, entitled "Electronic Equipment, Power Source Management Control Device For Electronic Equipment, And Power Source Device" and filed on Jun. 30, 2004 in the name of Sony Corporation (hereinafter, referred to as "the WO 2005/003941 system").

In the WO 2005/003941 system, the device comprises a battery as a secondary battery, a battery protecting circuit for controlling the battery, a fuel cell for generating power in an electricity-generating body by causing fuel and air to electrochemically react with each other, and a fuel cell controller for controlling the fuel cell.

The fuel cell controller and the battery protecting circuit transmit and receive information on a charged remaining capacity of the battery and the state of an output voltage of the fuel cell via a system management bus.

In the WO 2005/003941 system, the fuel cell controller and the battery protecting circuit share system load information of a central processing unit (CPU), which is recognized by an operating system (OS), in a computer via the system management bus so as to properly control the outputs of the fuel cell and the battery according to the load information.

For example, if portable electronic equipment can be sufficiently driven only by the output of the fuel cell, the battery is charged using the output of the fuel cell. If the portable electronic equipment cannot be driven only by the output of the fuel cell, the voltage of the battery is further discharged and supplied. If the fuel cell and the battery cannot supply power required by the portable electronic equipment, a main body of the computer is forcibly shut down.

However, in the WO 2005/003941 system, the fuel cell controller acquires the amount of power required by the portable electronic equipment, i.e., load information of a central processing unit (CPU), which is recognized by OS, via a system bus to recognize desired system power and then recognizes the desired amount of power, i.e., consuming power information, based on task scheduling. That is, it is impossible to perform power management and control corresponding to an actual system load.

Further, in the WO 2005/003941 system, if consuming power required at the system load exceeds the output power of the fuel cell and the charged remaining capacity of the battery, the main body of the computer is shut down. Accordingly, a smooth operation of the system cannot be attained.

Typically, in portable electronic equipment such as a portable computer, much power is consumed suddenly when several tasks are simultaneously processed by an optical disk driver (ODD), a floppy disk driver (FDD), and the like. Even though this situation does not frequently occur and occurs only during a short period of time, a main body of a computer system is forcibly shut down. Accordingly, this causes user's inconvenience in using the portable electronic equipment.

SUMMARY

Accordingly, an object of the present invention is to provide an apparatus and method for power management and control in portable electronic equipment, wherein efficient power supply can be achieved according to consuming power of a system load, output power of a fuel cell, and a charged remaining capacity of a battery.

Another object of the present invention is to provide an apparatus and method for power management and control in portable electronic equipment, wherein the performance of a system main body driven by power of a fuel cell or a charged voltage of a battery is limited if consuming power of the system main body exceeds the sum of the power of the fuel cell and the amount of the charged voltage of the battery.

A further object of the present invention is to provide an apparatus and method for power management and control in portable electronic equipment, wherein proper power management and control, including controlling the output of a fuel cell, charging a battery, and limiting the performance of a system, is performed according to a load by monitoring current consumption of an operation and processing block or an operation block of the system in real time.

According to an aspect of the present invention for achieving the objects, there is provided an apparatus for power management and control in portable electronic equipment, comprising: an operation block that is located within the portable electronic equipment having a power input terminal and a bus connection, performs various operations while consuming power when a driving voltage is supplied, and adjusts a system clock frequency in response to a performance limit signal; a fuel cell pack including a fuel cell for generating a voltage in an electricity-generating body by causing fuel and air to electrochemically react with each other, and a fuel cell controller for monitoring the state of the generated voltage; a battery pack including a secondary battery controller for monitoring information on a remaining capacity of an internal secondary battery and outputting the information; a consuming power sensor that senses the amount of power corresponding to a current consumed by the operation block and is connected from a voltage terminal of the fuel cell pack and a voltage terminal of the battery pack to a driving voltage input terminal of the operation block; and a power management and control unit having a control unit for acquiring the generated voltage capacity of the fuel cell and the information on the remaining capacity of the secondary battery via a bus connected to the bus connection and for providing a performance limit signal to the operation block so as to limit the performance of the system if the sensed consuming power exceeds the sum of the generated voltage capacity of the fuel cell and the remaining capacity of the secondary battery.

The apparatus may further comprise a discharge switch provided between the voltage terminal of the battery pack and the power input terminal so as to establish a discharge path for the secondary battery in response to a discharging signal output from the control unit.

The control unit preferably performs control such that the discharging signal is output only when the sensed power consumption is greater than an electricity-generating capacity of the fuel cell.

The control unit may block the discharging signal and may control a charger connected between an output node of the consuming power sensor and the voltage terminal of the battery pack so as to charge the secondary battery of the battery pack if the sensed consuming power is less than the generated voltage capacity of the fuel cell.

The consuming power sensor may be a current sense resistor.

A DC-DC converter for dropping and stabilizing an input voltage may be connected between an output node of the consuming power sensor and a driving voltage terminal of the operation block so as to provide the stabilized voltage to the operation block.

The fuel cell pack, the control unit, and the battery pack are connected via the bus of the bus connection, and the control unit acquires information on the electricity-generating capacity of the fuel cell and the remaining capacity of the battery via the bus.

The fuel cell controller of the fuel cell pack, the control unit, and the secondary battery controller of the battery pack may transmit and receive information to and from one another via a system management (SM) bus.

A basic input output system (BIOS) for setting and controlling basic input/output operations of the system may be connected to the operation block. The BIOS may limit the performance of the system in response to a performance limit signal (PLS) output from the control unit.

The operation block may control the rotational speeds of various motors.

According to another aspect of the present invention, there is provided a method for power management and control in portable electronic equipment including an operation block for performing various operations while consuming power when a driving voltage is supplied and for lowering a system clock frequency and rotational speeds of various motors in response to a performance limit signal (PLS), and a consuming power sensor for sensing consuming power of the operation block. The method comprises the steps of: upon connection of a fuel cell pack for generating a voltage in an electricity-generating body by causing fuel and air to electrochemically react with each other, supplying the voltage of the fuel cell pack to the operation block; and sensing the consuming power of the operation block by the consuming power sensor, and discharging the voltage of the battery pack mounted in the portable electronic equipment to supply the discharged voltage to the operation block if the sensed consuming power exceeds a generated voltage capacity of the fuel cell pack.

The method may further comprise the step of supplying the voltage of the fuel cell pack to the battery pack to charge the battery pack if the detected consuming power of the operation block is less than the generated voltage capacity of the fuel cell pack.

The method may further comprise the step of limiting performance by lowering an operation frequency of the operation block and the rotational speeds of the motors if the sensed consuming power of the operation block exceeds the sum of the voltage of the fuel cell pack and the voltage of the battery pack in a state where both the voltage of the fuel cell pack and the voltage of the battery pack are supplied to the operation block.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION

Hereinafter, an apparatus for power management in portable electronic equipment will be described in detail with reference to the accompanying drawings. It should be noted that the following description is exemplary only and that the present invention is not limited to the disclosed embodiment but may be implemented in different forms. Further, it should be noted that in the following description, detailed descriptions of functions and configurations known in the art, which may make the subject matter of the present invention obscure, will be omitted.

Figure 1:
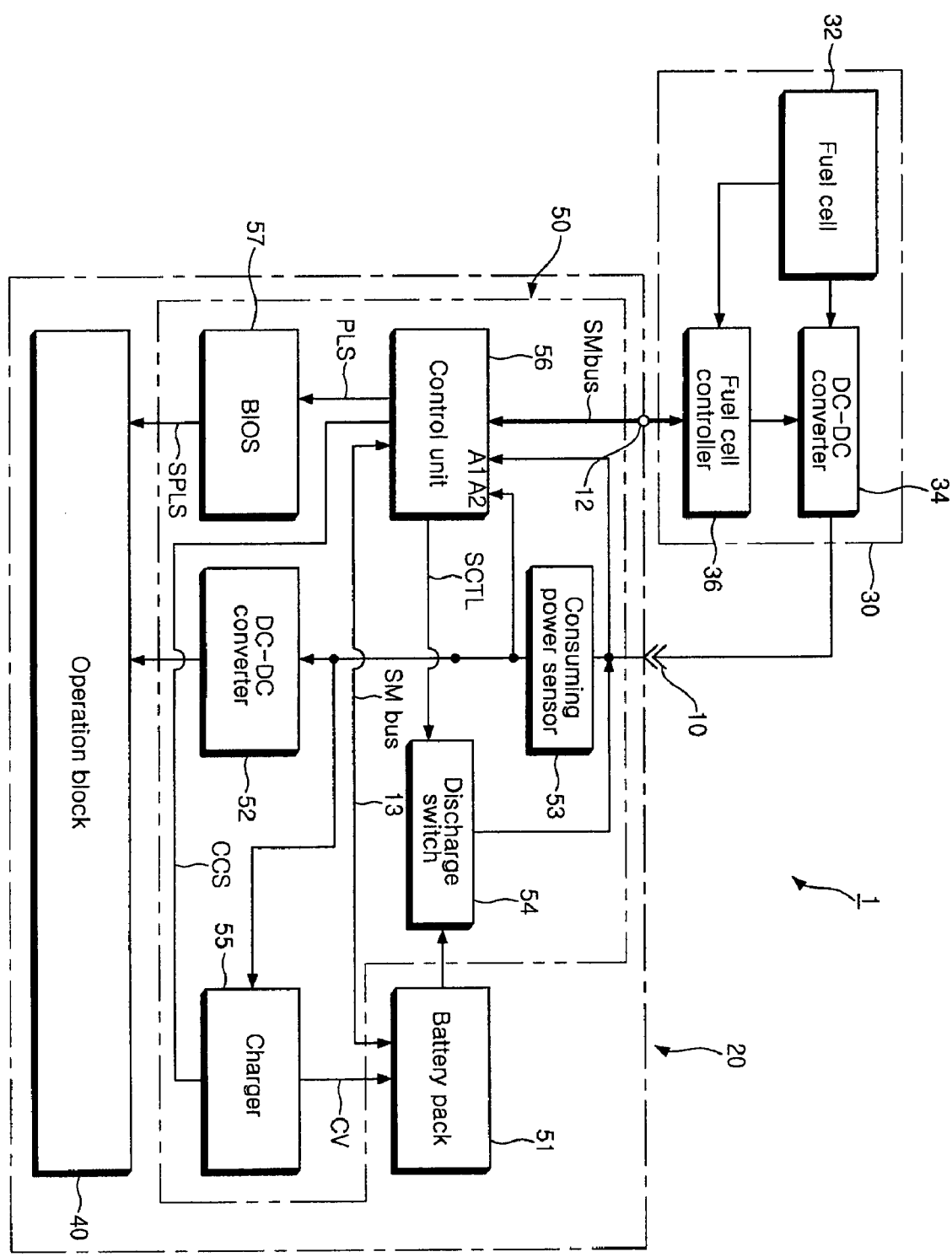
FIG. 1 is a block diagram illustrating portable equipment having a power management and control apparatus according to a preferred embodiment of the present invention.

FIG. 1 is a block diagram illustrating portable electronic equipment 1 that employs a power management and control apparatus according to a preferred embodiment of the present invention. Referring to FIG. 1, the portable electronic equipment 1 according to the present invention comprises a system main body 20 with a battery pack 51 coupled thereto, and a fuel cell pack 30 connected to a power input terminal 10 and a bus connection 12 of the system main body 20.

The fuel cell pack 30 comprises a fuel cell 32 for generating a voltage in an electricity-generating body by causing fuel and air to electrochemically react with each other, a DC-DC converter 34 for adjusting the voltage generated by the fuel cell 32 to a voltage with a level corresponding to a voltage control signal and for outputting the adjusted voltage, and a fuel cell controller 36 for monitoring the state of the fuel cell 32 and for controlling the operation of the DC-DC converter 34 through data transmission and reception to and from the outside.

An output terminal of the DC-DC converter 34 and a data terminal of the fuel cell controller 36 in the fuel cell pack 30 are connected to the power input terminal 10 and the bus connection 12 of the system main body 20, respectively.

The system main body 20 comprises an operation block 40 that consumes power while performing and processing various operations according to a user's demand or task processing when a driving voltage is supplied, and adjusts a frequency of an internal operation clock and lowers the rotational speeds of internal ODD and FDD motors in response to input of a performance limit signal (PLS). A system clock frequency of the operation block 40 may be supplied to a processor (CPU) (not shown) for generally controlling the portable electronic equipment 1. The system main body 20 comprises the battery pack 51 including a secondary battery controller for monitoring information on a charged remaining capacity of the internal secondary battery and outputting the information; and a power management and control unit 50 that monitors consuming power of the operation block 40 when the voltage terminal and the data terminal of the fuel cell pack 30 are connected to the power input terminal 10 and the bus connection 12, charges the battery pack 51 using a voltage generated in the fuel cell pack 30 or discharges the voltage of the battery pack 51 to the power input terminal 10 according to results of comparison of the sensed consuming power with an electricity-generating capacity of the fuel cell pack 30, and outputs a performance limit signal (PLS) to the operation block 40 if a voltage capacity that is the sum of the electricity-generating capacity of the fuel cell pack 30 and the charged remaining capacity of the battery pack 51 is less than the sensed consuming power.

The power management and control unit 50 comprises a consuming power sensor 53 that senses the consuming power of the operation block 40 in real time, is connected to a DC-DC converter 52 for stabilizing a voltage input via the power input terminal 10 into a voltage with a predetermined level, and supplies the voltage as an operation voltage for the operation block 40; a discharge switch 54 for connecting the voltage of the battery pack 51 to an input terminal of the consuming power sensor 53 in response to a discharging control signal; a charger 55 for converting a voltage at the voltage input terminal 10 or an output terminal of the consuming power sensor 53 into a charging voltage CV having a preset level so as to charge the battery pack 51 in response to a charging control signal CCS; and a control unit 56 for detecting the electricity-generating capacity of the fuel cell pack 30 and the charged remaining capacity of the battery pack 51 by transmitting and receiving data to and from the fuel cell pack 30 and the battery pack 51 via the bus connection, and for performing power management by generating the charging control signal CCS and the performance limit signal PLS according to the consuming power of the operation block 40 sensed by the consuming power sensor 53, the electricity-generating capacity of the fuel cell pack 30, and a voltage corresponding to the charged remaining capacity of the battery pack 51.

As shown in FIG. 1, a BIOS 57 for controlling basic input/output of the system is provided between the control unit 56 and the operation block 40, so that the BIOS 57 supplies the operation block 40 with a system performance limit signal SPLS for lowering the system clock frequency and lowering the rotational speed of a motor of an ODD or FDD in response to the performance limit signal PLS output from the control unit 56. However, it will be understood that if the control unit 56 can directly adjust the frequency of the operation block 40, the BIOS 57 may not be required.

The power management and control apparatus of the portable electronic equipment 1 constructed as shown in FIG. 1 preferentially supplies the operation block 40 with the generated voltage output from the fuel cell pack 30 upon connection of the fuel cell pack 30 to the system main body 20, and simultaneously blocks a discharge path of the battery pack 51.

Thereafter, the power management and control apparatus of the portable electronic equipment 1 charges the battery pack 51 while driving the operation block 40 using only the output voltage of the fuel cell pack 30 according to the consuming power of the operation block 40 in the system main body 20, the voltage capacity of the fuel cell pack 30, and the voltage capacity of the battery pack 51, simultaneously supplies both the voltage of the fuel cell pack 30 and the charged voltage of the battery pack 51 to the operation block 40, or lowers the system clock frequency of the operation block 40 to limit the performance of the system, thereby preventing the system from being shut down even when the consuming power of the operation block 40 temporarily exceeds the voltage capacities of the fuel cell pack 30 and the battery pack 51.

The power management and control apparatus of the portable electronic equipment 1 according to the present invention constructed as above charges the battery pack 51 while driving the operation block 40 using the output voltage of the fuel cell pack 30, when the consuming power of the operation block 40 does not exceed the output voltage of the fuel cell pack 30.

When the consuming power of the operation block 40 exceeds the output capacity of the fuel cell pack 30, the power management and control apparatus discharges the charged voltage of the battery pack 30 to supplement insufficient power by properly managing the output power of the fuel cell pack 30 and the battery pack 51 in cooperation with each other.

When the sum of the voltages of the fuel cell pack 30 and the battery pack 51 is insufficient to meet the consuming power of the operation block 40, the power management and control apparatus of the portable electronic equipment 1 lowers the system clock frequency of the operation block 40 and simultaneously lowers the rotational speeds of the driving motors of the ODD, the FDD and the like, so that the operation of the portable electronic equipment 1 can be properly controlled even when the consuming power temporarily increases.

Figure 2:
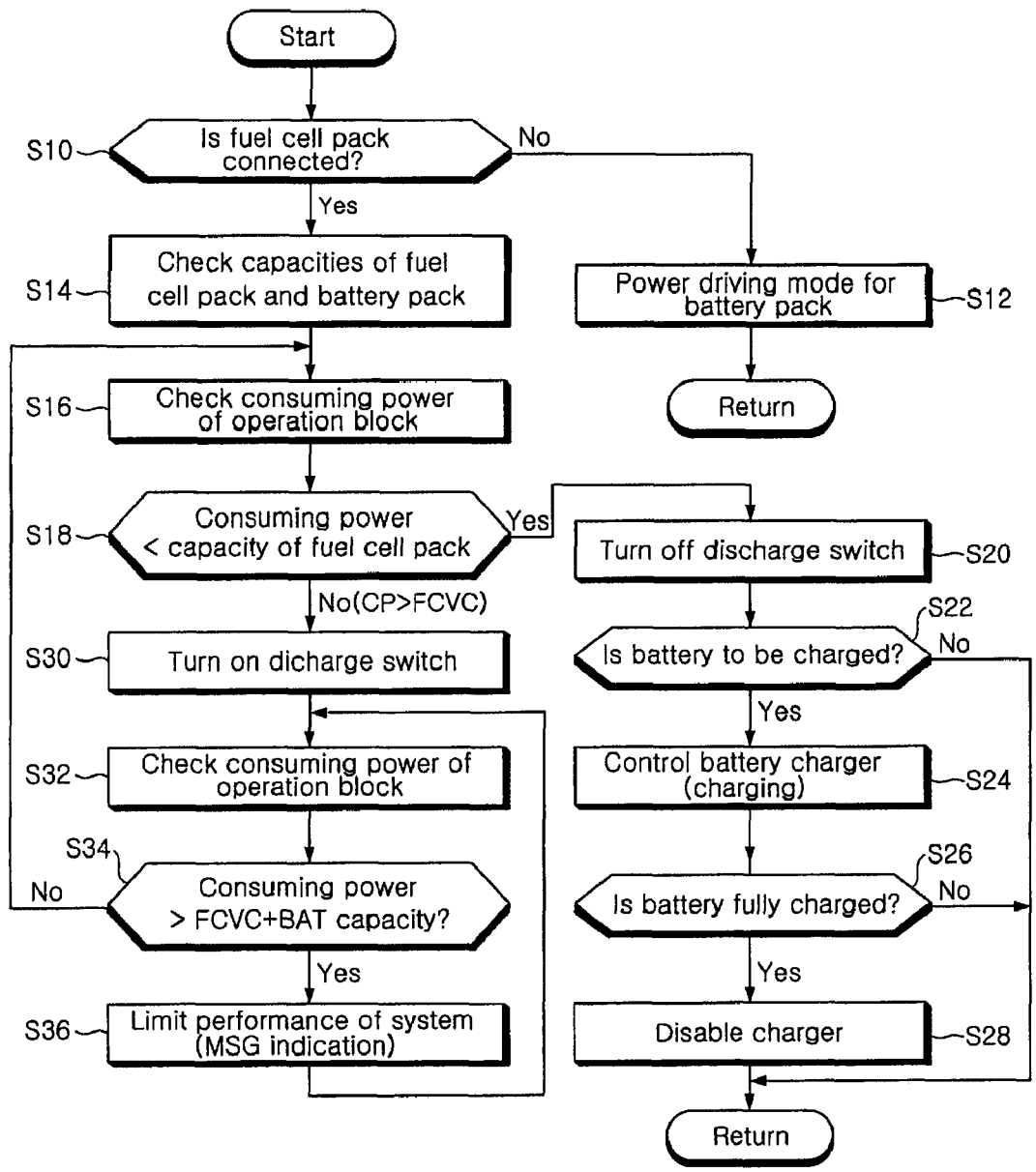
FIG. 2 is a flowchart illustrating a method for power management and control according to a preferred embodiment of the present invention.

FIG. 2 is a flowchart illustrating a method for power management and control, which is programmed in a ROM area of the control unit 56.

The operation of the power management apparatus of the portable electronic equipment 1 will be described in greater detail with reference to FIGS. 1 and 2.

When the portable electronic equipment 1 constructed as shown in FIG. 1 operates, the control unit 56 of the power management and control unit 50 in the system main body 20 reads data carried on the bus connection 12 in a predetermined period so as to determine whether the fuel cell pack 30 is connected to the system main body 20 (S10).

If it is determined in step S10 that the fuel cell pack 30 is not connected to the system main body 20, the control unit 56 outputs a switching control signal SCTL to turn on the discharge switch 54 (S12). Accordingly, the voltage of the battery pack 51 is supplied as an operation voltage to the operation block 40 via the discharge switch 54, the consuming power sensor 53, and the DC-DC converter 52.

If the fuel cell pack 30 is connected to the system main body 20, the output voltage of the fuel cell pack 30 is supplied to the operation block 40 via the consuming power sensor 53 and the DC-DC converter 52.

When the voltage of the fuel cell pack 30 or the battery pack 51 is supplied as the operation voltage to the operation block 40 via the consuming power sensor 53 and the DC-DC converter 52 as described above, the operation block 40 consumes power while performing various operations according to a user's demand or task processing at a speed based on a preset internal system clock frequency.

In this case, the consuming power sensor 53 connected between the power input terminal 10 and the operation block 40 senses the amount of a current consumed by the operation block 40 and supplies input terminals A1 and A2 of the control unit 56 with consuming power (CP) according to a load. Although the consuming power sensor 53 may be implemented in several different forms, it is implemented using a current sense resistor in the present invention.

Meanwhile, the control unit 56 of the system main body 20 transmits and receives data to and from the fuel cell controller 36 of the fuel cell pack 30 via the bus connection 12 so as to recognize a connection state of the fuel cell pack 30. The control unit 56 also sequentially transmits and receives data to and from the fuel cell controller 36 of the fuel cell pack 30 and the secondary battery controller of the battery pack 51 via the bus connection 12 and the data bus 13, respectively, so as to check the electricity-generating capacity of the fuel cell pack 30 and the charged remaining capacity of the battery pack 51 (S14). The bus connection 12 and the data bus 13 are serial data buses that may be a system management (SM) bus or an inter integrated circuit ($I^2C$) bus for clock and data transmission.

The control unit 56 converts an analog signal input via the input terminals A1 and A2 into a digital signal and checks the consuming power of the operation block 40 from the value of the digital signal (S16). After checking the voltage capacity of the fuel cell pack 30, the charged remaining capacity of the battery pack 51, and the consuming power of the operation block 40, the control unit 56 determines whether the output voltage of the fuel cell pack 30 is enough to drive the operation block 40 (S18).

That is, the control unit 56 compares the consuming power (CP) of the operation block 40 with the generated voltage capacity (FCVC) of the fuel cell pack 30 to determine whether the generated voltage capacity (FCVC) is greater than the consuming power (CP) of the operation block 40 (S18). If it is determined in step S18 that the generated voltage capacity (FCVC) of the fuel cell pack 30 is greater than the consuming power (CP), the control unit 56 inactivates the switching control signal SCTL to turn off the discharge switch 54 (S20).

Then, the control unit 56 analyzes the information on the charged remaining capacity of the battery pack 51, which has been acquired through data communication with the battery pack 51 via the data bus 13 in step S14, to determine whether charging the battery is required (S22). If it is determined in step S22 that the battery pack 51 is fully charged, the control unit 56 returns to the aforementioned initial step. If it is determined that the battery pack 51 is not fully charged, the control unit 56 activates the charging control signal CCS (S24).

In response to the activated charging control signal CCS, the charger 55 converts the voltage of the fuel cell pack 30 input via the consuming power sensor 53 into a charging voltage (CV) with a preset level, thereby charging the battery pack 51.

After the battery pack 51 is charged, the control unit 56 communicates data with the secondary battery controller of the battery pack 51 via the data bus 13 to determine whether the secondary battery is fully charged (S26). If it is determined in step S26 that the secondary battery is not fully charged, the control unit 56 returns to the aforementioned initial step. If the battery pack 51 is fully charged, the control unit 56 inactivates the charging control signal CCS, thereby disabling the charger 55.

Accordingly, if the generated voltage capacity of the fuel cell pack 30 is greater than the consuming power of the operation block 40, the voltage of the fuel cell pack 30 is used to stably drive the operation block 40 and charge the battery pack 51.

If it is determined in step S18 that the consuming power (CP) of the operation block 40 is greater than the generated voltage capacity (FCVC) of the fuel cell pack 30, the control unit 56 turns on the discharge switch 54 to establish a discharge path for the secondary battery in the battery pack 51 (S30) and then checks the consuming power of the operation block 40 sensed by the consuming power sensor 53 (S32).

When the discharge switch 54 is turned on, the charged voltage (BAT) of the battery pack 51 cooperates with the generated voltage (FCVC) output from the fuel cell pack 30, in the consuming power sensor 53. That is, the charged voltage (BAT) of the battery pack 51 is added to the generated voltage capacity (FCVC) of the fuel cell pack 30.

After checking the consuming power (CP) of the operation block 40 in step S32, the control unit 56 determines whether the consuming power (CP) of the operation block 40 exceeds the sum of the generated voltage capacity (FCVC) of the fuel cell pack 30 and the voltage (BAT) of the battery pack 51 (S34).

If it is determined in step S34 that the consuming power (CP) of the operation block 40 is less than the sum of the generated voltage capacity (FCVC) of the fuel cell pack 30 and the voltage (BAT) of the battery pack 51, the control unit 56 jumps to step S16 and then drives the operation block 40 with the both voltages.

However, if it is determined in step S34 that the consuming power (CP) of the operation block 40 exceeds the sum of the generated voltage capacity (FCVC) of the fuel cell pack 30 and the voltage (BAT) of the battery pack 51, the control unit 56 provides the performance limit signal PLS to the BIOS 57 (S36).

In response to the performance limit signal PLS, the BIOS 57 lowers the system clock frequency of the operation block 40 and limits the rotational speeds of the motors of the ODD, the FDD and the like to lower values. This process limits the performance of the operation block 40, thereby reducing the consuming power thereof.

If the consuming power increases temporarily and rapidly as the operation block 40 performs a number of tasks, the control unit 56 automatically lowers the system clock frequency of the operation block 40 or the rotational speeds of the motors consuming much power in such a manner that the consuming power of the system main body 20 does not exceed the generated voltage capacity of the fuel cell pack 30.

As described above, the power management and control apparatus of the portable electronic equipment 1 according to the present invention establishes the discharge path for the battery pack 51 to supplement insufficient power using the charged voltage of the battery pack 51 if the consuming power of the system main body 20 exceeds the generated voltage capacity (FCVC) of the fuel cell pack 30. If the consuming power of the system main body 20 does not exceed the generated voltage capacity of the fuel cell pack 30 and the voltage of the battery pack 51 is not sufficiently charged, the power management and control apparatus enables the charger 55 so that the level of the charged voltage of the battery pack 51 is always in a fully charged state.

If the sum of the generated voltage of the fuel cell pack 30 and the voltage of the battery pack 5101 is less than the consuming power of the operation block 40, the power management and control apparatus performs proper power management by limiting the performance of the operation block 40 to reduce overall power consumption in such a manner that the consuming power of the operation block 40 does not exceed the generated voltage capacity of the fuel cell pack 30.

The portable electronic equipment is not limited only to a notebook computer but may be a variety of battery-powered electronic equipment such as PDAs, communication equipment, portable information terminals, and cameras.

As described above, according to the present invention, power management in portable electronic equipment powered by a voltage from a fuel cell pack is performed by monitoring the consuming power of an operation block in real time, charging/discharging a battery pack and limiting the performance of the operation block according to the sensed consuming power of the operation block and the generated voltage capacity of the fuel cell pack. Thus, the system is prevented from being shut down even when much power is temporarily consumed in the system main body.

What is claimed is:

1. An apparatus for managing power in an electronic device, comprising:
    an operation module located in the electronic device and consuming power in response to a driving voltage, the operation module being configured to adjust a frequency of an internal operation clock in response to a performance limit signal;
    a fuel cell module including a fuel cell for generating a voltage and a fuel cell controller for monitoring the generated voltage;
    a battery module including a secondary battery and a secondary battery controller for monitoring a remaining capacity of the secondary battery; and
    a control module including:
        a power sensor module configured to sense an amount of power consumed by the operation module in real time, the power sensor module being coupled to a voltage terminal of the fuel cell module, a voltage terminal of the battery module, and a driving voltage input terminal of the operation module,
        a discharge module configured to provide voltage of the battery module to an input terminal of the power sensor module in response to a discharging control signal, and
        a charger module configured to convert voltage at the input terminal of the power sensor module or at an output terminal of the power sensor module into a charging voltage with a preset level so as to charge the battery module in response to a charging control signal,
    wherein the control module is configured to:
        acquire a generated voltage capacity of the fuel cell module and the charged remaining capacity of the secondary battery by exchanging data with the fuel cell module and the battery module via a data bus,
        generate the charging control signal according to the sensed amount of power consumed by the operation module, the generated voltage capacity of the fuel cell module, and the charged remaining capacity of the battery module, and
        generate the performance limit signal to the operation module if the sensed amount of consumed power by the operation module exceeds a sum of the acquired generated voltage capacity of the fuel cell and the acquired charged remaining capacity of the secondary battery.

2. The apparatus of claim 1, wherein the discharge module is arranged so as to establish a discharge path for the secondary battery in response to the discharging control signal, which is output from the control module.

3. The apparatus of claim 2, wherein the control module is further configured to block the discharging control signal and control a charger coupled to an output node of the power sensor module and the voltage terminal of the battery module so as to charge the secondary battery of the battery module if the sensed consuming power is less than the generated voltage capacity of the fuel cell.

4. The apparatus of claim 3, wherein the power sensor module comprises a current sense resistor.

5. The apparatus of claim 1, wherein the fuel cell controller of the fuel cell module, the control module, and the secondary battery controller of the battery module exchange information via a data bus comprising at least one of a system management (SM) data bus and an inter integrated circuit (I2C) data bus.

6. The apparatus of claim 1, wherein the control module is further configured to:
    monitor the consuming power of the operation module using the power sensor module if the voltage terminal and a data terminal of the fuel cell module are connected to a power input terminal and a bus connection of the operation module,
    charge the battery module using generated voltage of the fuel cell module or discharge voltage of the battery module to the power input terminal based on results of a comparison of the sensed consumed power with the generated voltage capacity of the fuel cell module, and
    output the performance limit signal to the operation module if the sum of the generated voltage capacity of the fuel cell module and the charged remaining capacity of the battery module is less than the sensed consumed power.

7. The apparatus of claim 6, further comprising a DC-DC converter configured to provide a stabilized input voltage to the operation module, the DC-DC converter being interposed between an output node of the power sensor module and the driving voltage input terminal of the operation module.

8. The apparatus of claim 7, wherein the power sensor module comprises a current sense resistor.

9. The apparatus of claim 1, wherein the operation module is further configured to control rotational speeds of at least one motor.

10. The apparatus of claim 1, wherein the fuel cell generates the voltage in an electricity-generating body by causing fuel and air to electrochemically react.

11. The apparatus of claim 1, wherein the operation module, the battery module, the power sensor module, and the control module are co-located in a body of the electronic device, and wherein the fuel cell module is located external to the body.

12. A method comprising:
    monitoring a voltage capacity generated by a fuel cell located outside a electronic device;
    monitoring a remaining capacity of a battery located in the electronic device;
    monitoring, in real time by a power sensor module, an amount of power consumed by an operation module in the electronic device, the power sensor module being coupled to a voltage terminal of the fuel cell, a voltage terminal of the battery, and a driving voltage input terminal of the operation module;
    acquiring the generated voltage capacity of the fuel cell and the remaining capacity of the battery;

providing voltage of the battery module to an input terminal of the power sensor module in response to a discharging control signal;

converting voltage at the input terminal of the power sensor module or at an output terminal of the power sensor module into a charging voltage with a preset level so as to charge the battery in response to a charging control signal;

generating the charging control signal according to the monitored amount of power consumed by the operation module, the generated voltage capacity of the fuel cell module, and the charged remaining capacity of the battery module;

adjusting a frequency of an operation clock in the electronic device when the amount of consumed power exceeds a sum of the generated voltage capacity of the fuel cell and the remaining capacity of the battery; and discharging voltage of the battery to supply the discharged voltage to the operation module when the amount of consumed power exceeds the generated voltage capacity of the fuel cell.

13. The method of claim 12, further comprising supplying the generated voltage capacity of the fuel cell to the operation module when the amount of consumed power is less than the generated voltage capacity of the fuel cell.

14. The method of claim 13, further comprising, when the amount of consumed power is less than the generated voltage capacity of the fuel cell:
generating the charging control signal; and
after generating the charging control signal, utilizing the generated voltage capacity of the fuel cell to generate the charging voltage with the preset level.

15. The method of claim 14, wherein monitoring an amount of power consumed by an operation module in the electronic device includes sensing the amount of current flowing between a power input terminal of the electronic device and the operation module.

16. The method of claim 12, further comprising reducing rotation speed of at least one of an optical disk drive and a floppy disk drive of the electronic device when the amount of consumed power exceeds a sum of the generated voltage capacity of the fuel cell and the remaining capacity of the battery.

17. The method of claim 12, wherein adjusting the frequency of the operation clock when the amount of consumed power exceeds a sum of the generated voltage capacity of the fuel cell and the remaining capacity of the battery includes sending a performance limit signal to a basic input/output system of the electronic device.

18. The method of claim 12, wherein adjusting the frequency of the operation clock when the amount of consumed power exceeds a sum of the generated voltage capacity of the fuel cell and the remaining capacity of the battery includes lowering the frequency of the operation clock until the amount of consumed power is less than the generated voltage capacity of the fuel cell.

19. A system comprising:
means for monitoring a voltage capacity generated by a fuel cell located outside a electronic device;
means for monitoring a remaining capacity of a battery located in the electronic device;
means for monitoring, in real time by a power sensor module, an amount of power consumed by an operation module in the electronic device, the power sensor module being coupled to a voltage terminal of the fuel cell, a voltage terminal of the battery, and a driving voltage input terminal of the operation module;
means for providing voltage of the battery module to an input terminal of the power sensor module in response to a discharging control signal;
means for converting voltage at the input terminal of the power sensor module or at an output terminal of the power sensor module into a charging voltage with a preset level so as to charge the battery in response to a charging control signal;
means for generating the charging control signal according to the monitored amount of power consumed by the operation module, the generated voltage capacity of the fuel cell module, and the charged remaining capacity of the battery module; and
means for adjusting a frequency of an operation clock in the electronic device when the amount of consumed power exceeds a sum of the generated voltage capacity of the fuel cell and the remaining capacity of the battery.

* * * * *